(12) United States Patent
Dix et al.

(10) Patent No.: US 9,421,958 B2
(45) Date of Patent: Aug. 23, 2016

(54) BRAKING SYSTEM FOR A WORK VEHICLE

(71) Applicant: CNH Industrial America, LLC, New Holland, PA (US)

(72) Inventors: Peter J. Dix, Naperville, IL (US); Pawel Kuros, Wood Dale, IL (US)

(73) Assignee: CNH Industrial America LLC, New Holland, PA (US)

( * ) Notice: Subject to any disclaimer, the term of this patent is extended or adjusted under 35 U.S.C. 154(b) by 98 days.

(21) Appl. No.: 14/312,786

(22) Filed: Jun. 24, 2014

(65) Prior Publication Data
US 2015/0367827 A1    Dec. 24, 2015

(51) Int. Cl.
| B60T 13/00 | (2006.01) |
| B60T 13/68 | (2006.01) |
| B60T 13/14 | (2006.01) |
| B60T 13/66 | (2006.01) |
| B60T 13/22 | (2006.01) |

(52) U.S. Cl.
CPC ............ B60T 13/686 (2013.01); B60T 13/141 (2013.01); B60T 13/22 (2013.01); B60T 13/662 (2013.01)

(58) Field of Classification Search
CPC .. B60T 13/686; B60T 13/141; B60T 13/662; B60T 8/885; B60T 13/22
USPC ...... 303/2, 3, 9, 10, 11, 15, 6.01, 9.61, 9.63, 303/122, 122.04, 122.05, DIG. 9, DIG. 10; 188/151 A, 151 R, 355, 358
See application file for complete search history.

(56) References Cited

U.S. PATENT DOCUMENTS

| 4,339,154 | A | 7/1982 | Duttarer et al. | |
| 5,310,251 | A * | 5/1994 | Towers | B60T 13/686 188/151 A |
| 5,370,449 | A | 12/1994 | Edelen et al. | |
| 5,704,693 | A | 1/1998 | Mackiewicz | |
| 5,904,228 | A * | 5/1999 | Eike | B60T 13/22 188/170 |
| 5,941,608 | A | 8/1999 | Campau et al. | |
| 6,513,885 | B1 | 2/2003 | Salamat et al. | |
| 6,527,348 | B2 | 3/2003 | Jensen | |
| 6,550,870 | B1 * | 4/2003 | Goodzey | B60T 8/885 303/15 |
| 7,497,528 | B2 | 3/2009 | Reuter et al. | |
| 2010/0062897 | A1 | 3/2010 | Nishino et al. | |

FOREIGN PATENT DOCUMENTS

WO    WO 2009/156833    12/2009

* cited by examiner

Primary Examiner — Pamela Rodriguez
(74) Attorney, Agent, or Firm — Sue C. Watson

(57) ABSTRACT

A braking system for a work vehicle may generally include a hydraulically actuated brake, a tank containing hydraulic fluid and a brake valve fluidly connected between the tank and the hydraulically actuated brake. The brake valve may be movable between an on position and an off position for controlling a flow of the hydraulic fluid from the tank to the hydraulically actuated brake. The brake valve may include a first solenoid coil and a second solenoid coil, with each of the solenoid coils being configured to be independently energized and de-energized for moving the brake valve between the on and off positions. The system may also include a first control device electrically connected to the first solenoid coil for energizing and de-energizing the first solenoid coil and a separate second control device electrically connected to the second solenoid coil for energizing and de-energizing the second solenoid coil.

20 Claims, 4 Drawing Sheets

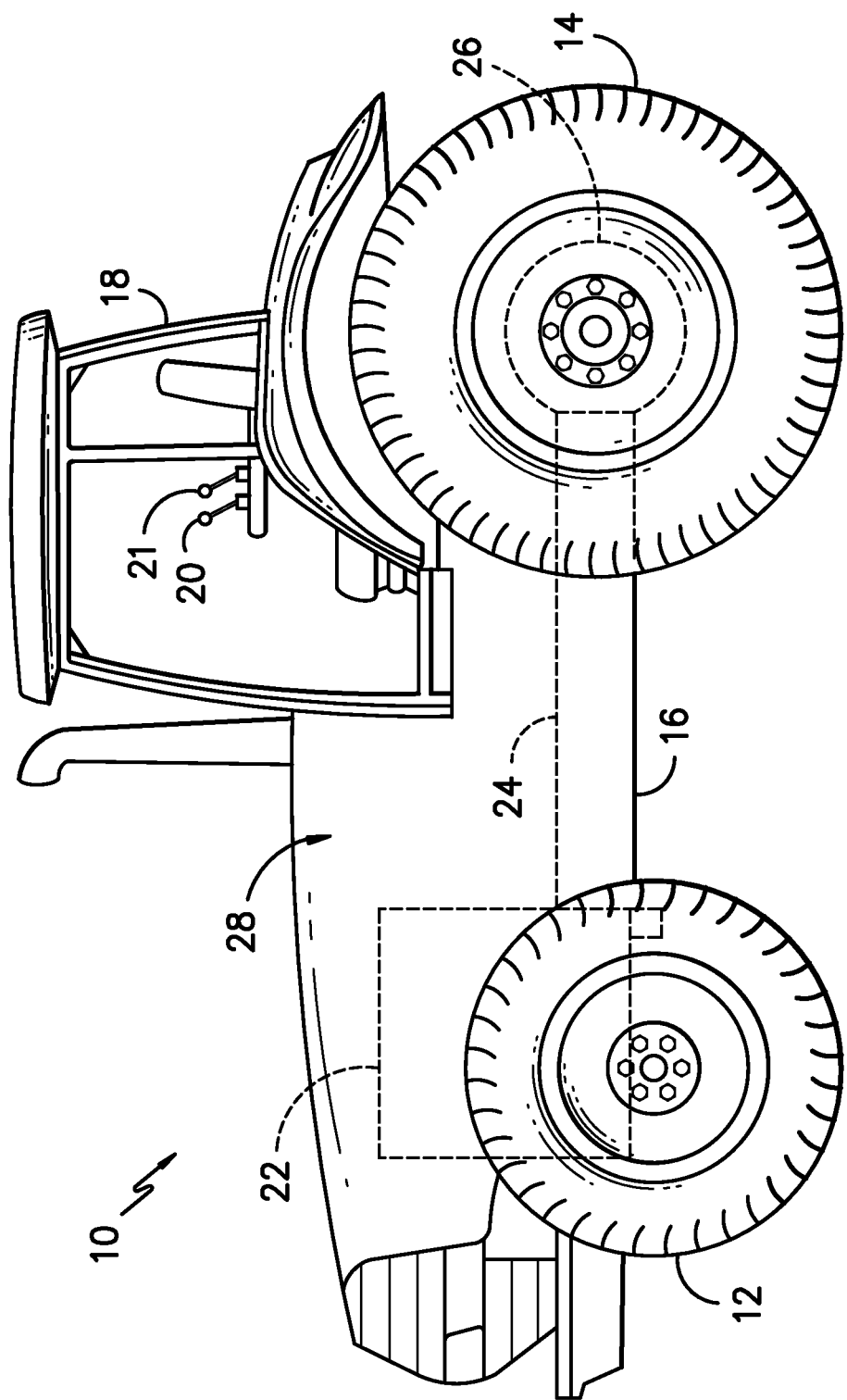
FIG. -1-

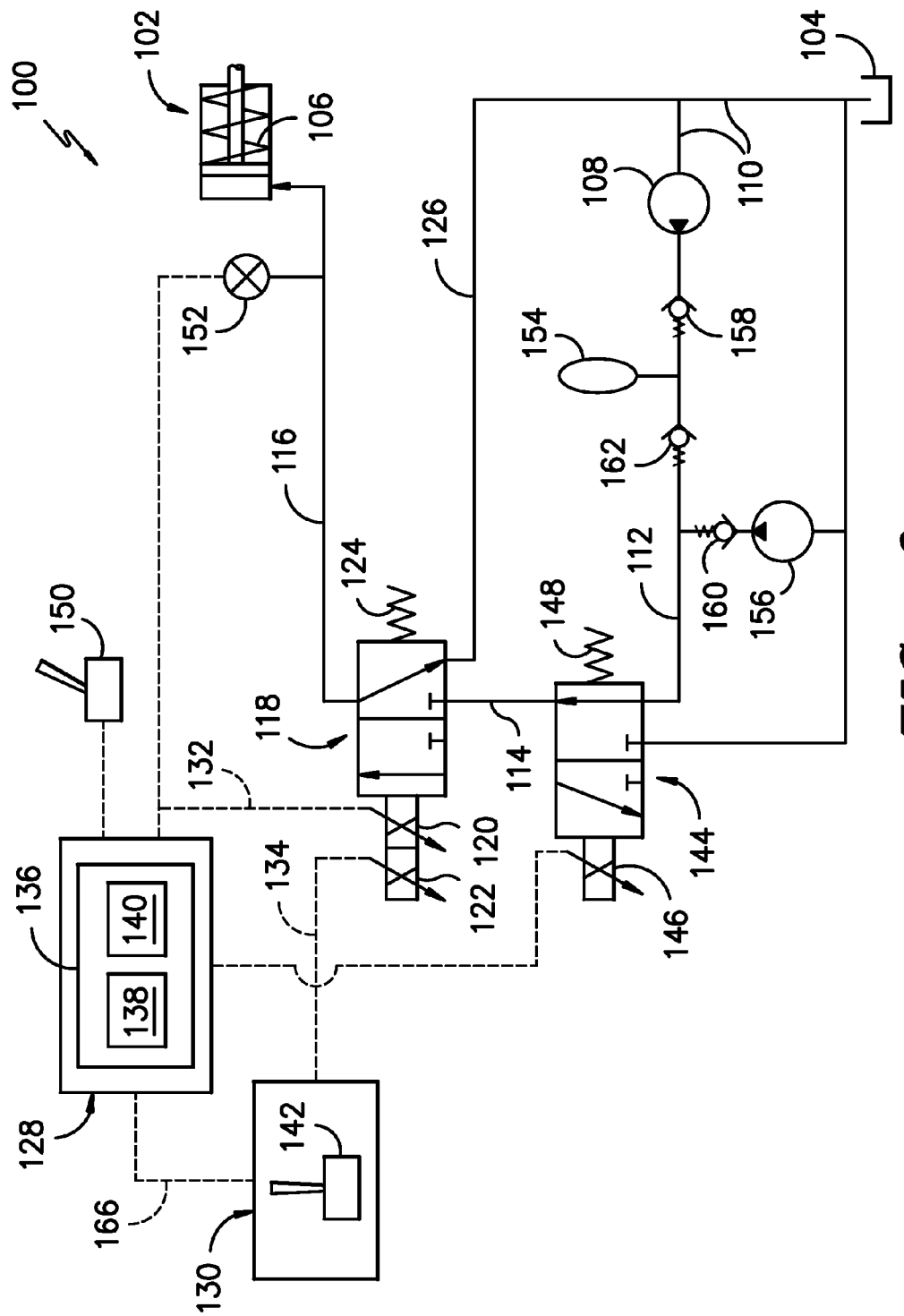
FIG. -2-

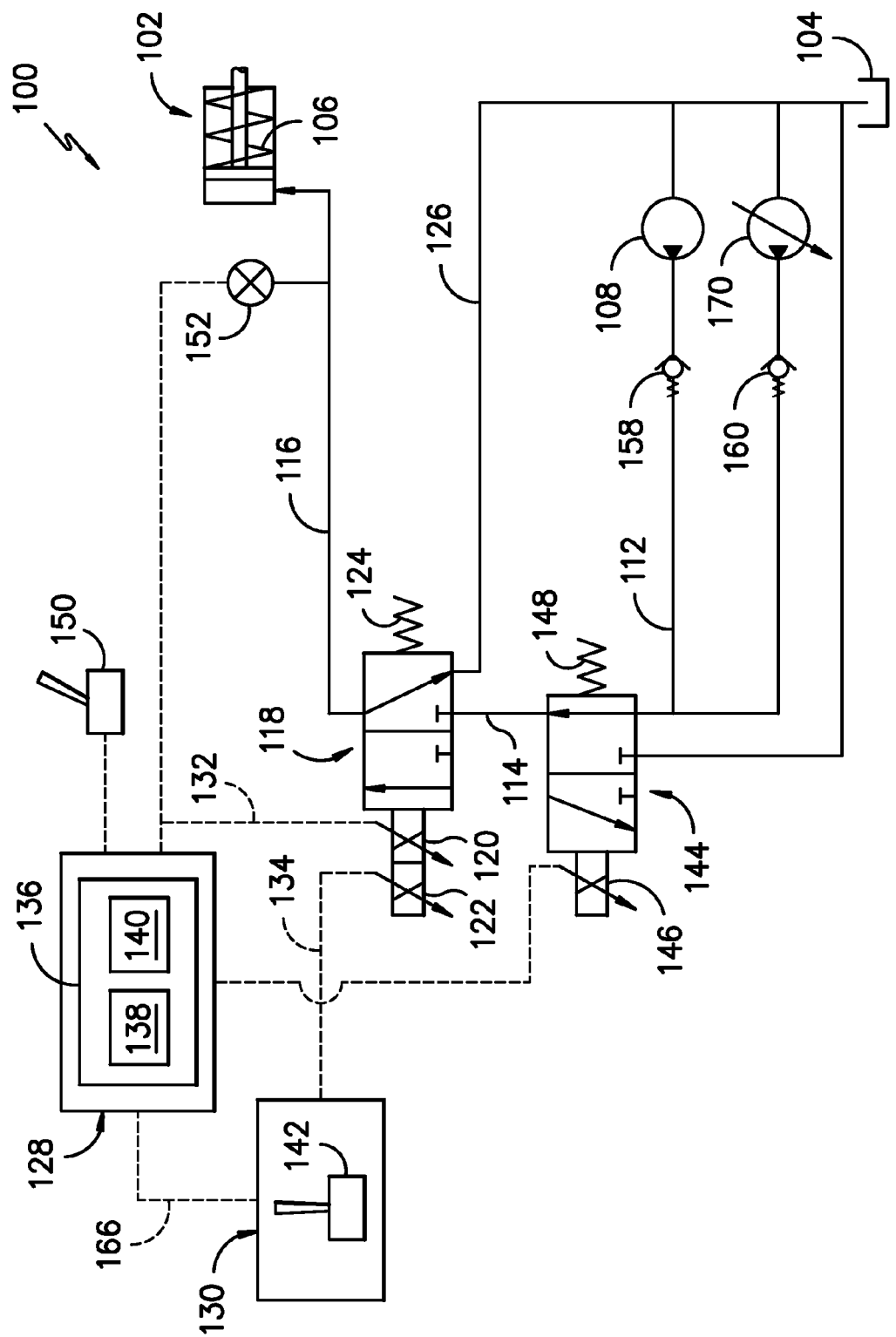
FIG. -3-

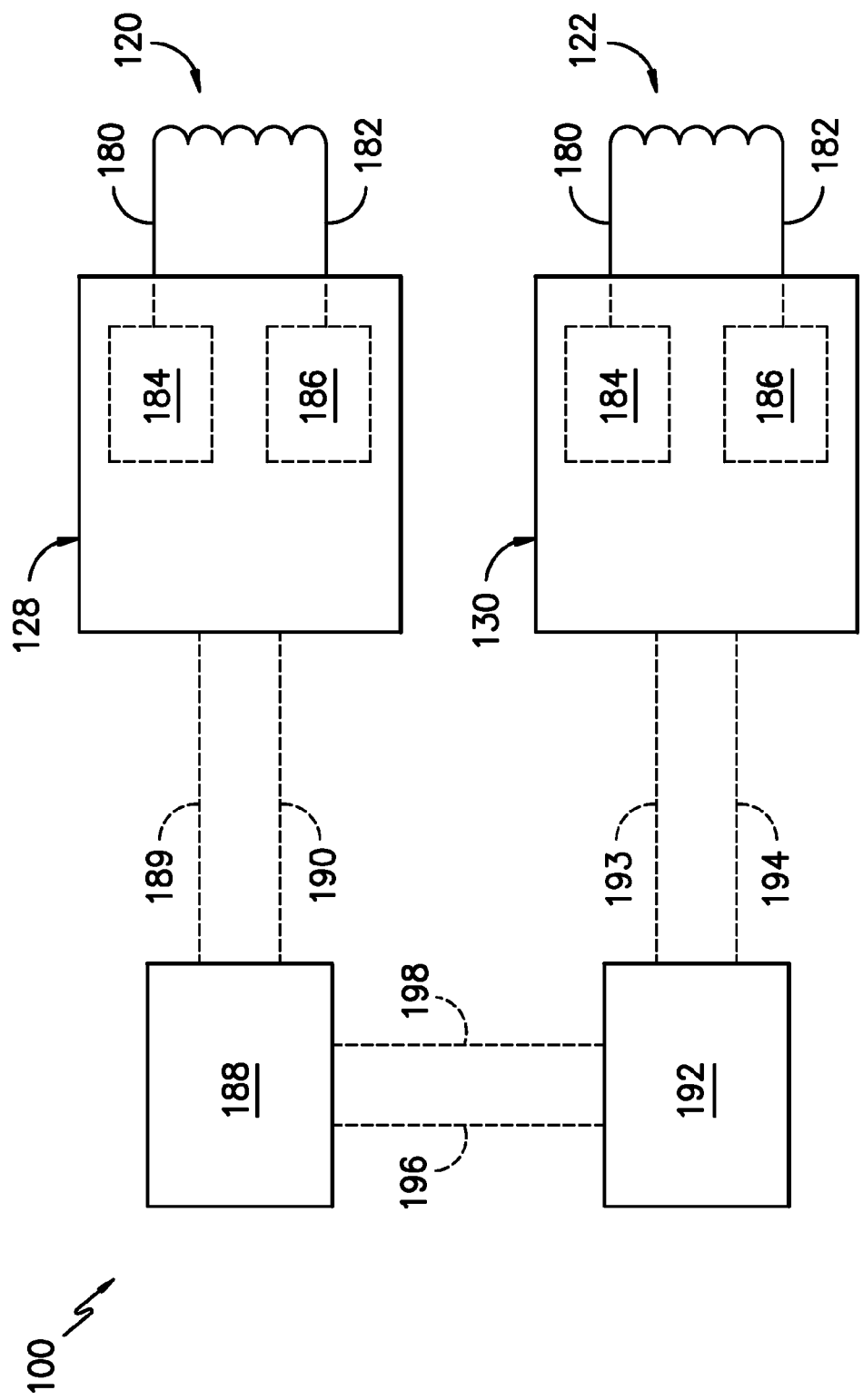
FIG. -4-

BRAKING SYSTEM FOR A WORK VEHICLE

FIELD OF THE INVENTION

The present subject matter relates generally to work vehicles and, more particularly, to a braking system for a work vehicle.

BACKGROUND OF THE INVENTION

Work vehicles often include a parking brake having a spring applied, hydraulic release design. Thus, when the supply of hydraulic fluid is cut-off from the brake's actuator or fluid is being supplied to the actuator at a relatively low pressure, a biasing spring within the actuator forces the parking brake into an engaged state. In contrast, when hydraulic fluid is being supplied to the actuator at a relatively high pressure, the force provided by such high pressure fluid is sufficient to overcome the biasing force provided by the spring, thereby allowing the parking brake to be disengaged.

Typically, the supply of hydraulic fluid to the parking brake is controlled via a simple on/off valve, such as a single-coil solenoid activated on/off valve. Thus, by energizing and de-energizing the single coil, the valve may be moved between its open and closed positions. In the open position, hydraulic fluid may be supplied to the parking brake at a sufficient pressure to overcome the biasing force provided by the spring and, thus, disengage the brake. Similarly, in the closed position, the supply of hydraulic fluid to the parking brake is cut-off, thereby allowing the brake to be engaged.

While the above-described braking system is effective in allowing the parking brake to be engaged/disengaged under most circumstances, the system is not well-equipped to handle electrical faults and/or other system faults. For example, with a spring applied, hydraulic release brake, the on/off valve may be no longer capable of maintaining the brake disengaged when a wiring or coil fault associated with the valve occurs. As a result, the parking brake may be inadvertently engaged while the vehicle is being driven. Other conventional braking systems suffer the same type of drawback, with each failing to provide an effective means for maintaining a parking brake in its current state despite an electrical fault or other system fault.

Accordingly, an improved braking system that is designed to maintain functionality despite the occurrence of electrical faults or other system faults would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a braking system for a work vehicle. The system may generally include a hydraulically actuated brake, a tank containing hydraulic fluid and a brake valve fluidly connected between the tank and the hydraulically actuated brake. The brake valve may be movable between an on position and an off position for controlling a flow of the hydraulic fluid from the tank to the hydraulically actuated brake. The brake valve may include a first solenoid coil and a second solenoid coil, with each of the solenoid coils being configured to be independently energized and de-energized for moving the brake valve between the on and off positions. The system may also include a first control device electrically connected to the first solenoid coil for energizing and de-energizing the first solenoid coil and a separate second control device electrically connected to the second solenoid coil for energizing and de-energizing the second solenoid coil.

In another aspect, the present subject matter is directed to a braking system for a work vehicle. The system may generally include a spring applied, hydraulic release parking brake, a tank containing hydraulic fluid and a brake valve fluidly connected between the tank and the parking brake. The brake valve may be movable between an on position and an off position for controlling a flow of the hydraulic fluid from the tank to the parking brake. The brake valve may include a first solenoid coil and a second solenoid coil, with each of the solenoid coils being configured to be independently energized and de-energized for moving the brake valve between the on and off positions. The system may also include a first control device electrically connected to the first solenoid coil for energizing and de-energizing the first solenoid coil and a separate second control device electrically connected to the second solenoid coil for energizing and de-energizing the second solenoid coil. In addition, the system may also include a proportional valve fluidly connected between the tank and the brake valve. The proportional valve may be electrically connected to one of the first control device or the second control device and may be configured to proportionally control a pressure of the hydraulic fluid based on signals received from the first control device or the second control device.

In a further aspect, the present subject matter is directed to a method for controlling a hydraulically actuated brake of a work vehicle. The method may generally include supplying pressurized hydraulic fluid from a tank through a fluid line in fluid communication with the hydraulically actuated brake and selectively energizing and de-energizing a first solenoid coil associated with a brake valve fluidly connected between the tank and the hydraulically actuated brake, wherein the first solenoid coil is energized using a first control device. In addition, the method may include selectively energizing and de-energizing a second solenoid coil associated with the brake valve, wherein the second solenoid coil is energized using a second control device that is separate from the first control device.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a side view of one embodiment of a work vehicle;

FIG. 2 illustrates a schematic view of one embodiment of a braking system suitable for use with the work vehicle shown in FIG. 1;

FIG. 3 illustrates a schematic view of an alternative embodiment of the braking system shown in FIG. 2; and FIG. 4 illustrates a schematic view of one embodiment of electrical connections that may be used for the solenoid coils of disclosed braking system in accordance with aspects of the present subject matter.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a braking system for a work vehicle. Specifically, in several embodiments, the system may correspond to an electro-hydraulic control system for a spring applied, hydraulic release parking brake. For example, the system may include a dual-coil, solenoid activated on/off brake valve configured to turn the supply of hydraulic fluid to the parking brake on/off and a solenoid activated proportional valve configured to allow for proportional control of the engagement/disengagement of the parking brake.

As will be described in greater detail below, the solenoid coils of the dual-coil brake valve may be electrically isolated from one another, with each coil being communicatively coupled to a separate control device for energizing/de-energizing the coil. Such a dual-coil configuration, together with the use of separate control devices, allows for redundant electronic control of the parking brake. Specifically, regardless of any single point electrical failure occurring within the system, the dual-coil brake valve may be controlled in a manner that allows the parking brake to remain off when the work vehicle is being driven or on when the vehicle is parked.

In addition, the proportional control of the parking brake via the proportional valve provides an electrically activated emergency brake function for the disclosed system. Specifically, when the work vehicle is being driven, the current command to the proportional valve may be increased to gradually or quickly engage the parking brake in the event of a failure of the vehicle's primary brakes and/or due to any other event that necessitates use of the parking brake in such manner. Such proportional control may generally allow the braking force applied via the parking brake to be accurately controlled so as to prevent losing control of the work vehicle and/or overturning of an implement(s) being pulled by the vehicle.

Referring now to the drawings, FIG. 1 illustrates a side view of one embodiment of a work vehicle 10. As shown, the work vehicle 10 is configured as an agricultural tractor. However, in other embodiments, the work vehicle 10 may be configured as any other suitable work vehicle known in the art, such as various other agricultural vehicles, earth-moving vehicles, loaders and/or various other off-road vehicles.

As shown in FIG. 1, the work vehicle 10 includes a pair of front wheels 12, a pair of rear wheels 14 and a chassis 16 coupled to and supported by the wheels 12, 14. An operator's cab 18 may be supported by a portion of the chassis 16 and may house various control or input devices 20, 21 (e.g., levers, pedals, control panels, buttons and/or the like) for permitting an operator to control the operation of the work vehicle 10. For instance, as shown in FIG. 1, the work vehicle 10 may include a Forward-Neutral-Reverse-Park (FNRP) lever 20 and an emergency brake lever 21 configured to be communicatively coupled to a suitable controller (not shown) for electronically controlling the operation of the vehicle 10. In addition, the work vehicle 10 may include an engine 22 and a transmission 24 mounted on the chassis 16. The transmission 24 may be operably coupled to the engine 22 and may provide variably adjusted gear ratios for transferring engine power to the wheels 14 via an axle/differential 26. The engine 22, transmission 24, and axle/differential 26 may collectively define a drivetrain 28 of the work vehicle 10.

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration 10. For example, in an alternative embodiment, a separate frame or chassis may be provided to which the engine 22, transmission 24, and differential 26 are coupled, a configuration common in smaller tractors. Still other configurations may use an articulated chassis to steer the work vehicle 10, or rely on tracks in lieu of the wheels 12, 14. Additionally, although not shown, the work vehicle 10 may also be configured to be operably coupled to any suitable type of work implement, such as a trailer, spray boom, manure tank, feed grinder, plow and/or the like.

Referring now to FIG. 2, a schematic diagram of one embodiment of a braking system 100 suitable for use with the work vehicle 10 shown in FIG. 1 is illustrated in accordance with aspects of the present subject matter. In general, the braking system 100 will be described herein with reference to controlling the operation of a parking brake of the work vehicle 10. However, the disclosed system may generally be utilized to control the operation of any suitable hydraulically actuated brake(s) of any given work vehicle, such as the service or primary brakes of a work vehicle or an emergency brake of a work vehicle.

It should be appreciated that the solid lines extending between the various components of the system 100 generally represent fluid connections between such components for the flow of hydraulic fluid or any other suitable fluid. Similarly, the dashed lines extending between the various components of the system 100 generally represent electrical connections between such components.

As shown in FIG. 2, the system 100 may generally include a hydraulically actuated parking brake 102 in fluid communication with a storage tank storing hydraulic fluid. In several embodiments, the parking brake 102 may correspond to a spring applied, hydraulic pressure release brake. As such, the parking brake 102 may be normally engaged or activated in the absence of high pressure hydraulic fluid. Specifically, when the supply of hydraulic fluid from the tank 104 is cut off or otherwise provided to the parking brake 102 at a low pressure, a spring 106 (or other suitable biasing means) within the brake actuator may be configured to exert a suitable force for maintaining the parking brake 102 engaged. However, as the pressure of the hydraulic fluid supplied within the brake actuator is increased, such increased pressure may overcome the biasing force of the spring 106 (or other biasing means), thereby disengaging or releasing the parking brake 102.

The system 100 may also include a suitable pump 108 fluidly connected between the parking brake 102 and the tank 104 for pumping fluid to the brake 102. For example, fluid line 110 may be coupled between the tank 104 and the pump 108 for providing a fluid pathway between such components. Hydraulic fluid flowing to the pump 108 via fluid line 110 may then be supplied to the parking brake 102 via fluid lines 112, 114 and 116. In several embodiments, the pump 108 may correspond to an engine-driven hydraulic pump. For instance, the pump 108 may be configured to be coupled to the engine 22 of the work vehicle 10 via a suitable shaft/belt arrangement or using any other suitable coupling means that allows the pump 108 to be driven by the engine 22. Alternatively, the pump 108 may correspond to any other suitable type of pump, such as an electric hydraulic, pump.

Additionally, the system 100 may include a brake valve 118 fluidly connected between the pump 108 (e.g., via fluid lines 112, 114) and the parking brake 102 (e.g., via fluid line 116) for controlling the supply of hydraulic fluid to the brake 102. Specifically, in several embodiments, the brake valve 118 may be a dual-coil, solenoid activated on/off valve configured to be moved between a park or "OFF" position (as shown in the illustrated embodiment) and a drive or "ON" position (not shown). For example, as shown in FIG. 2, the brake valve 118 may include a first solenoid coil 120 and a second solenoid coil 122. In addition, the brake valve 118 may include a spring 124 (or any other suitable biasing means) configured to bias the brake valve 118 into the "OFF" position. In such an embodiment, when at least one of the solenoid coils 120, 122 is energized, the energized coil(s) is configured to apply a force against an actuator (not shown) of the brake valve 118 sufficient to overcome the biasing force applied by the spring 124, thereby moving the valve 118 to the "ON" position. In the "ON" position, hydraulic fluid flowing from the pump 108 via fluid lines 112 and 114 may be directed through the brake valve 118 to the parking brake 102 (via fluid line 116) to allow the brake 102 to be disengaged. Similarly, when both of the solenoid coils 120, 122 are de-energized, the spring 124 (or other biasing means) may return the brake valve 118 to the "OFF" position. Specifically, in the "OFF" position, the parking brake 102 may be disconnected from the supply of pressurized fluid provided by the pump 108, thereby allowing the brake 102 to be re-engaged (e.g., via the spring 106 or other biasing means). Moreover as shown in FIG. 2, when the brake valve 118 is moved to the "OFF" position, hydraulic fluid contained within the brake actuator and fluid line 116 may be supplied back to the tank 104 via fluid line 126.

It should be appreciated that the brake valve 118 may generally have any suitable dual-coil configuration known in the art. For instance, in one embodiment, the first and second solenoid coils 120, 122 may be wrapped around or otherwise positioned proximal to a common poppet or actuator configured to move the valve 118 from the "OFF" position to the "ON" position when magnetically actuated via the first and/or second coil 120, 122. Alternatively, each coil 120, 122 may be associated with a separate poppet or actuator configured to move the valve 118 from the "OFF" position to the "ON" position when magnetically actuated.

As indicated above, in several embodiments, the solenoid coil 120, 122 of the brake valve 118 may be electrically isolated from one another, with each coil 120, 122 being coupled to a separate driver or control device configured to independently energize/de-energize such coil for allowing the brake valve 118 to be moved between the "OFF" and "ON" positions. For example, as shown in FIG. 2, the first solenoid coil 120 is communicatively coupled to a first control device 128 via a first electrical connection 132 and the second solenoid coil 122 is communicatively coupled to a separate, second control device 130 via a separate, second electrical connection 134. In such an embodiment, each control device 128, 130 may be configured to control its respective solenoid coil 120, 122 without any interact with and/or reliance on the other control device. Specifically, the first solenoid coil 120 may only be energized via suitable control signals (i.e., current signals) transmitted from the first control device 128. Similarly, the second solenoid coil 122 may only be energized via suitable control signals (i.e., current signals) transmitted from the second control device 130.

In several embodiments, the first control device 128 may correspond to an electronic control unit or controller 136 of the work vehicle 10. In such embodiments, the controller 136 may be configured to transmit suitable control signals (e.g., in the Rum of current signals) in order to selectively energize the first solenoid coil 120. For instance, when the work vehicle 10 is being driven, the controller 136 may, in one embodiment, be configured to maintain the first solenoid coil 120 in an energized state so as to hold the brake valve. 118 in the "ON" position, thereby allowing the parking brake 118 to remain disengaged. Similarly, when the work vehicle 10 is parked, the controller 136 may be configured to de-energize the first solenoid coil 120 (e.g., by not actively supplying current to the coil 120) in order to allow the brake valve 118 to be moved to the "OFF" position.

It should be appreciated that, as used herein, the term "controller" generally refers to any suitable processor-based device and/or any combination of processor-based devices, such as one or more computing devices. Thus, in several embodiments, a controller(s) of the work vehicle 10 may generally include one or more processors and associated memory devices configured to perform a variety of computer-implemented functions. For example, as shown in FIG. 2, the controller 136 includes a processor(s) 138 and an associated memory device(s) 140. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the controller(s) to perform various computer-implemented functions. In addition, the controller(s) may also include various other suitable components, such as a communications circuit or module, one or more input/output channels, one or more valve drivers, a data/control bus and/or the like.

Moreover, as shown in FIG. 2, the second control device 130 may, in several embodiments, be a control lever 142 of the work vehicle 10. For instance, in one embodiment, the control lever 142 may correspond to the FNRP lever 20 of the work vehicle 10. In such an embodiment, the second solenoid coil 122 may be energized/de-energized as a function of the position of the FNRP lever 20. Specifically, when the FNRP lever 20 is moved from the "PARK" position to one of the "DRIVE" positions (e.g., forward, reverse or neutral), the second solenoid coil 122 may be energized so as to move the brake valve 118 to the corresponding "ON" position. Similarly, when the FNRP lever 20 is moved back to the "PARK" position, the second solenoid coil 122 may be de-energized so as to move the brake valve 118 to the corresponding "OFF" position. In another embodiment, the control lever 142 may correspond to any other suitable control or input lever of the work vehicle 10. For instance, the control lever 142 may correspond to the emergency brake lever 21 of the work vehicle 10. In another embodiment, the control lever 142 may correspond to a park brake lever (not shown) of the work vehicle 10, with a separate control(s) being used to shift the vehicle 10 between forward, neutral and reverse.

It should be appreciated that, in alternative embodiments, the first and second control devices 128, 130 may correspond to any other suitable devices/mechanisms that provide for independent control of the solenoid coils 120, 122. For instance, in one embodiment, the second control device 130 may also be a controller of the work vehicle 10. In such an embodiment, the second control device 130 may correspond to a separate controller than the controller 136 being used as the first control device 128. In another embodiment, the first control device 128 may correspond to a separate control or input lever housed within the cab 18 of the work vehicle 10.

It should also be appreciated that, in several embodiments, the first and second control devices 128, 130 may be communicative coupled to one another (e.g., via line 166 shown in FIG. 2). As a result, the control devices 128, 130 may communicate regarding the respective control of each solenoid coil 120, 122 as well as any faults occurring within the system 100. For instance, if the control lever 142 is moved, the second control device 130 may be configured to transmit a suitable signal to the first control device 128 to indicate that the second solenoid coil 122 is being activated or deactivated in accordance with the lever movement.

By providing a dual-coil brake valve 118 that can be electronically actuated by one of two separate control devices 128, 130, the disclosed system 100 provides for redundant control of the parking brake 102. Specifically, the brake valve 118 allows for the parking brake 102 to remain off when the work vehicle 10 is being driven or on when the vehicle 10 is parked, despite any single point electrical failure. For instance, given the dual-coil configuration, energizing either solenoid coil 120, 122 (or both) causes the valve to be maintained in the "ON" position, thereby disengaging the parking brake 102. Thus, if an electrical fault or other system fault occurs that results in either coil 120, 122 being rendered inoperable, the other coil may be used to maintain the parking brake 102 in its disengaged state.

Referring still to FIG. 2, the system 100 may also include a proportional valve 144 fluidly connected between the pump 108 (e.g., via fluid line 112) and the brake 118 (e.g., via fluid line 114) for regulating the particular pressure at which the hydraulic fluid is supplied to the parking brake 102 when the brake valve 118 is in "ON" position. In general, the proportional valve 144 may correspond to any suitable variable pressure control valve known in the art. For instance, as shown in FIG. 2, the proportional valve 144 corresponds to a solenoid activated proportional valve. Thus, in several embodiments, the proportional valve 144 may include both a solenoid coil 146 and a spring 148 (or any other suitable biasing means) configured to move the proportional valve 144 between a full pressure or "OPEN" position and a zero pressure or "CLOSED" position.

In a particular embodiment, the proportional valve 144 may be configured to be normally at the "OPEN" position.

Thus, when the solenoid coil 146 is de-energized, the spring 148 (or other biasing means) may force the valve 144 into the "OPEN" position, thereby allowing the maximum pressure of the hydraulic fluid supplied by the pump 108 to be transmitted to the parking brake 102 via fluid lines 114, 116 (assuming the brake valve 118 is in the "ON" position). As such, the parking brake 102 may be normally disengaged when brake valve 118 is in the "ON" position. Similarly, by providing a high current signal to the solenoid coil 146, the proportional valve 144 may be moved to the "CLOSED" position so as to completely cut off the supply of hydraulic fluid to the parking brake 102, thereby allowing the brake to be engaged via the spring 106 (or other suitable biasing means).

In addition, by providing a current signal to the solenoid coil 146 that is greater than zero but less than the high current required to move to valve 144 to the "CLOSED" position, the proportional valve 144 may be moved to any suitable position between the "OPEN" and "CLOSED" positions, thereby allowing the pressure of the hydraulic fluid supplied to the parking brake 102 to be varied in a manner that provides for proportional control of the brake 102. Specifically, the pressure of the hydraulic fluid supplied through fluid lines 114, 116 may be directly proportional to the current supplied to the solenoid coil 146. Thus, by carefully selecting a coil current between zero and the required high current, the operation of the proportional valve 144 may be controlled so as to supply hydraulic fluid to the parking brake 102 at any given pressure that allows for partial engagement of the brake 102.

As shown in FIG. 2, to allow for such control of the proportional valve 144, the valve 144 may, in several embodiments, be communicatively coupled to the first control device 128. For example, in embodiments in which the first control device 128 corresponds to a controller 136 of the work vehicle 10, the controller 136 may be configured to transmit suitable current commands to the proportional valve 144 for controlling the operation of the valve 144 in a manner that allows for proportional control of the parking brake 102. In such embodiments, the current commands may be generated independently by the controller 136 (e.g., based on sensor inputs, such as by detecting when the operator has left his/her seat) or may be generated as a function of operator inputs provided to the controller 136. For instance, as shown in FIG. 2, a control lever 150 of the work vehicle 10 (e.g., the emergency brake lever 21) may be communicatively coupled to the first control device 128 to allow the parking brake 102 to be proportionally controlled by the operator while driving. Specifically, the controller 136 may be configured to transmit current commands to the solenoid coil 146 that are proportional to the position of the control lever 150. Thus, by adjusting the position of the control lever, 150 an operator may command the system 100 to proportionally control the braking force provided by the parking brake 102.

It should be appreciated that the proportional valve 144 generally provides the disclosed system 100 with an emergency brake function that allows the work vehicle 10 to be slowed and/or stopped in the event that the vehicle's primary brakes fail while the vehicle 10 is being driven (or in the event of any other system failure or fault that results in the loss of braking capabilities). Specifically, in the event of brake failure, the proportional valve 144 may be controlled in a manner that allows the parking brake 102 to be gradually engaged, thereby gradually increasing the braking force applied by the brake 102. For instance, using the control lever 150 shown in FIG. 2, the operator may transmit suitable signals to the controller 136 in order to control the rate at which the work vehicle 10 is slowed using the parking brake 102.

Moreover, it should be appreciated that, by configuring the proportional valve 144 to be normally opened, the parking brake 102 may be maintained in its disengaged state while the work vehicle 10 is being driven even in the event of a system fault. For instance, upon the occurrence of an open circuit fault that renders the solenoid coil 146 inoperable, the spring 148 for other biasing means) may maintain the proportional valve in the "OPEN" position, thereby allowing the maximum pressure to be supplied to the parking brake 102 in order to prevent the brake 102 from engaging.

Operation of the disclosed system 100 will now be generally described with reference to FIG. 2. Specifically, when the work vehicle 10 is in park, the first and second solenoid coils 120, 122 may be de-energized such that the brake valve 118 is maintained in the "OFF" position. As such, the parking brake 102 may be engaged and any hydraulic fluid within the brake actuator and/or fluid line 116 may be supplied hack to the storage tank 104 via fluid line 126. Additionally, in one embodiment, the solenoid coil 146 associated with the proportional valve 144 may be energized while the work vehicle 10 is in park to ensure that no high pressure fluid is supplied within fluid line 114.

Moreover, when the vehicle 10 is shifted from park to drive (e.g., by moving the FNRP lever 20 to one of the "DRIVE" positions), the second solenoid coil 122 (and, optionally, the first solenoid coil 120) may be energized to move the brake valve 118 to the "ON" position. With the brake valve 118 at the "ON" position, the supply of hydraulic fluid to the parking brake 102 may be controlled proportionally via the proportional valve 144. As indicated above, the proportional valve 144 may be electronically controlled (e.g., via controller 136) so that the valve 144 can be completely closed, completely opened or partially opened in order to regulate the pressure of the fluid supplied to the parking brake 102. For instance, when the work vehicle 10 is initially shifted into drive, the solenoid coil 146 can be de-energized to allow the proportional valve 144 to be moved to the "OPEN" position, thereby completely disengaging the parking brake 102. Thereafter, the solenoid coil 146 may be energized while the vehicle 10 is still being driven to partially or fully engage the parking brake 102, fix example, upon receipt of a suitable command from the operator (e.g., via the control lever 150) or upon the occurrence a given event (e.g., when it is detected that the operator has left his/her seat and/or when it is detected that the work vehicle 100 has not moved for a predetermined period of time).

It should be appreciated that, during operation of the system 100, the various system components may be continuously monitored to detect short circuits and/or other system faults that may impact system operation. Upon the detection of a fault, a suitable notification may be provided to the operator and/or an appropriate action may be taken to adjust the system's operation in order to maintain functionality (e.g., by adjusting the control logic associated with one or both of the control devices 128, 130).

It should also be appreciated that, as indicated above, the disclosed system 100 is extremely well adapted for maintaining functionality despite the occurrence of system faults. For instance, if a wiring or coil fault associated with the proportional valve 144 occurs, the parking brake 102 may continue to be engaged and disengaged (i.e., by moving the brake valve 118 between the "OFF" and "ON" positions) despite the loss in proportional control. Similarly, if a wiring or coil fault associated with the first control device 128 and/or the first solenoid coil 120, the second control device 130 may be used to energize the second solenoid coil 122 in order to move the brake valve 118 to the "ON" position. In such instance, the proportional valve 144 may still be used to provide full proportional control of the parking brake 102. Similarly, if a wiring or coil fault associated with the second control device 130 and/or the second solenoid coil 122 occurs, the first control device 128 may be used to energize the first solenoid coil 120 in order to move the brake valve 118 to the "ON" position, with full proportional control of the parking brake 102 still be available via the proportional valve 144.

Referring still to FIG. 2, the system 100 may also include various other components and/or features for improving or enhancing the operation of the system 100. For instance, in several embodiments, the system 100 may include one or more pressure sensors 152 for monitoring the pressure of the hydraulic fluid supplied through one or more of the various fluid lines. For example, as shown in FIG. 2, a pressure sensor 152 may be positioned immediately upstream of the parking brake 102 for monitoring the pressure of the hydraulic fluid supplied through fluid line 116. In such an embodiment, the pressure sensor 152 may be communicatively coupled to a suitable controller of the work vehicle 10 (e.g., controller 136) to allow the controller to electronically determine the current state of the parking brake 102. Specifically, if the hydraulic pressure detected by the pressure sensor 152 is relatively low (e.g., below a given low pressure threshold), it may be determined that the parking brake 102 is engaged. Similarly, if the hydraulic pressure detected by the pressure sensor 152 is relatively high (e.g., above a given high pressure threshold), it may be determined that the parking brake 102 is disengaged.

As shown in FIG. 2, the system 100 may also include a pressure accumulator 154 fluidly connected between the pump 108 and the parking brake 102 (e.g., along fluid line 112). The accumulator 154 may generally be configured to store pressurized hydraulic fluid so as to allow the parking brake 102 to be disengaged in the event of a system failure. For instance, if the pump 108 is an engine-driven pump, stalling of the engine 22 can result in a loss of pressure within the system 100, which would otherwise lead to engagement of the parking brake 102. In such instance, the accumulator 154 may be configured to supply pressurized fluid in order to maintain the parking brake 102 in its disengaged state. It should be appreciated that, in several embodiments, the accumulator 154 may be sized and/or may otherwise be configured to allow the parking brake 102 to be disengaged several times, if necessary, during operation of the work vehicle 10.

Additionally, as shown in FIG. 2, the system 100 may include a secondary or back-up pump 156 to provide a means for disengaging the parking brake 102 in the event that the primary pump 108 is not functioning properly. For instance, in several embodiments, the back-up pump 156 may correspond to a hand-operated or manual pump accessible within the operator's cab 18.

Moreover, the system 100 may also include one or more check valves 158, 160, 162 to prevent the backflow of hydraulic fluid within the system 100. For instance, as shown in FIG. 2, first and second check valves 158, 160 may be positioned immediately downstream of the primary and back-up pumps 108, 156, respectively, to prevent fluid from leaking back through such pumps 108, 156. Additionally, as shown in FIG. 2, a third check valve 162 may be positioned immediately downstream of the pressure accumulator 154.

Referring now to FIG. 3, a schematic view of an alternative embodiment of the system 100 shown in FIG. 2 illustrated in accordance with aspects of the present subject matter. As shown in FIG. 3, the system 100 may generally include many or all of the various components shown in FIG. 2, with such components generally being configured as described above. However, in the illustrated embodiment, the system 100 includes an electric hydraulic pump 170 configured to serve as a back-up pump in the event that the engine-driven pump 108 is not functional properly (e.g., when the engine 22 stalls). As a result, the electric pump 170 may replace the hand-operated or manual pump 156. In addition, the electric pump 170 may also be used to replace the pressure accumulator 154 described above. Specifically, unlike the accumulator 154, the electric pump 170 may allow for unlimited engagement/disengagement of the parking brake 102.

It should be appreciated that operation of the electric pump 170 may be controlled electronically via one of the control devices 128, 130. For instance, in one embodiment, the pump 170 may be communicatively coupled to the controller 136 to allow for electronic control thereof.

Referring now to FIG. 4, a schematic diagram of the electrical connections for the first and second solenoid coils 120, 122 is illustrated in accordance with aspects of the present subject matter. As shown, both sides of each coil 120, 122 (e.g., a high side 180 and a low side 182) are separately connected to its associated control device 128, 130. For instance, in several embodiments, each control device 128, 130 may include a separate driver 184, 186 electrically connected to the high side 180 and low side 182 of the associated coil 120, 122, respectively, such that each side 10, 182 can be separately controlled. In such embodiments, each driver 184, 186 may be separately monitored for faults (e.g., by monitoring input voltage and/or coil current using any suitable device, such as an analog-to-digital convertor), which may allow for the detection of single point electrical faults, such as open wiring, shorts to the battery or input voltage and/or shorts to ground. As a result, the system 100 may be configured to detect and quickly react to electrical faults.

It should be appreciated that each driver 184, 186 may generally correspond to any suitable switch or other suitable driver mechanism that allows the electrical connection between its associated coil 120, 122 and the input voltage or ground to be turned on or off. For instance, in one embodiment, each driver 184, 186 may correspond to a MOFSET driver, which may allow for the electrically connection to be switched on and off rather quickly, it should also be appreciated that, although not shown, the high and low sides of the solenoid coil 146 associated with the proportional valve 144 may also be separately coupled to its corresponding control device (e.g., the first control device 128) via separate drivers.

Moreover, as shown in FIG. 4, in several embodiments, each control device 128, 130 may be electrically coupled to a separate power source. For instance, a first power source 188 may be electrically coupled to the first control device 128 (e.g., via a power line 189 and a ground line 190) and a second power source 192 may be electrically coupled to the second control device 130 (e.g., via a power line 193 and a ground line 194). In one embodiment, the first power source 188 may correspond to an alternator of the work vehicle 10 and the second power source 192 may correspond to a battery of the work vehicle 10, with the alternator and the battery being electrically coupled to one another (e.g., via a suitable power line 196 and ground line 198). However, in other embodiments, the first power source 188 and/or second power source 190 may correspond to any other suitable power source.

It should be appreciated that the present subject matter is also directed to a method for controlling a hydraulically actuated brake of a work vehicle. In general, the method may include supplying pressurized hydraulic fluid from a tank through a fluid line in fluid communication with the hydraulically actuated brake. The method may also include selectively energizing and de-energizing a first solenoid coil associated with a brake valve fluidly connected between the tank and the hydraulically actuated brake, wherein the first solenoid coil is energized using a first control device. In addition, the method may include selectively energizing and de-energizing a second solenoid coil associated with the brake valve, wherein the second solenoid coil is energized using a second control device that is separate from the first control device.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A braking system for a work vehicle, the braking system comprising:
   a hydraulically actuated brake;
   a tank containing hydraulic fluid;
   a brake valve fluidly connected between the tank and the hydraulically actuated brake, the brake valve being movable between an on position and an off position for controlling a flow of the hydraulic fluid from the tank to the hydraulically actuated brake, the brake valve including a first solenoid coil and a second solenoid coil, each of the first and second solenoid coils being configured to be independently energized and de-energized for moving the brake valve between the on and off positions;
   a first control device electrically connected to the first solenoid coil for energizing and de-energizing the first solenoid coil; and
   a separate second control device electrically connected to the second solenoid coil for energizing and de-energizing the second solenoid coil,
   wherein the first solenoid coil is electrically isolated from the second solenoid coil.

2. The braking system of claim 1, wherein the hydraulically actuated brake comprises a spring applied, hydraulic release parking brake.

3. The braking system of claim 1, wherein the first control device comprises a controller of the work vehicle.

4. The braking system of claim 3, wherein the second control device comprises one of a control lever of the work vehicle or a second controller of the work vehicle.

5. The braking system of claim 1, wherein the brake valve is in the on position when at least one of the first solenoid coil or the second solenoid coil is energized.

6. The braking system of claim 5, wherein the brake valve is in the off position when the first and second solenoid coils are both de-energized.

7. The braking system of claim 1, further comprising a proportional valve fluidly connected between the tank and the brake valve, the proportional valve being electrically connected to one of the first control device or the second control device, the proportional valve being configured to proportionally control a pressure of the hydraulic fluid based on signals received from the first control device or the second control device.

8. The braking system of claim 7, wherein the proportional valve is normally in an open position, wherein a maximum pressure of the hydraulic fluid is delivered through the proportional valve when the proportional valve is in the open position.

9. The braking system of claim 1, further comprising a hydraulic pump and an accumulator fluidly connected between the brake valve and the tank.

10. The braking system of claim 1, further comprising an engine-driven pump and an electric pump fluidly connected between the brake valve and the tank.

11. A braking system for a work vehicle, the braking system comprising:
  a spring applied, hydraulic release parking brake;
  a tank containing hydraulic fluid;
  a brake valve fluidly connected between the tank and the parking brake, the brake valve being movable between an on position and an off position for controlling a flow of the hydraulic fluid from the tank to the parking brake, the brake valve including a first solenoid coil and a second solenoid coil, each of the first and second solenoid coils being configured to be independently energized and de-energized for moving the brake valve between the on and off positions;
  a first control device electrically connected to the first solenoid coil for energizing and de-energizing the first solenoid coil;
  a separate second control device electrically connected to the second solenoid coil for energizing and de-energizing the second solenoid coil; and
  a proportional valve fluidly connected between the tank and the brake valve, the proportional valve being electrically connected to one of the first control device or the second control device, the proportional valve being configured to proportionally control a pressure of the hydraulic fluid based on signals received from the first control device or the second control device.

12. The braking system of claim 11, wherein the first control device comprises a controller of the work vehicle and the second control device comprises one of a control lever of the work vehicle or a second controller of the work vehicle.

13. The braking system of claim 11, wherein the brake valve is in the on position when at least one of the first solenoid coil or the second solenoid coil is energized and the brake valve is in the off position when the first and second solenoid coils are both de-energized.

14. The braking system of claim 11, wherein the proportional valve is normally in an open position, wherein a maximum pressure of the hydraulic fluid is delivered through the proportional valve when the proportional valve is in the open position.

15. The braking system of claim 11, further comprising a hydraulic pump and an accumulator fluidly connected between the brake valve and the tank.

16. The braking system of claim 11, further comprising an engine-driven pump and an electric pump fluidly connected between the brake valve and the tank.

17. The braking system of claim 11, wherein the first solenoid coil is electrically isolated from the second solenoid coil.

18. A method for controlling a hydraulically actuated brake of a work vehicle, the method comprising:
  supplying pressurized hydraulic fluid from a tank through a fluid line in fluid communication with the hydraulically actuated brake;
  selectively energizing and de-energizing a first solenoid coil associated with a brake valve fluidly connected between the tank and the hydraulically actuated brake, the first solenoid coil being energized using a first control device; and
  selectively energizing and de-energizing a second solenoid coil associated with the brake valve, the second solenoid coil being energized using a second control device that is separate from the first control device.

19. The method of claim 18, further comprising controlling a proportional valve fluidly connected between the tank and the brake valve in order to proportionally control a pressure of the hydraulic fluid supplied to the hydraulically actuated brake when at least one of the first solenoid coil or the second solenoid coil is energized.

20. The method of claim 18, wherein the first solenoid coil is electrically isolated from the second solenoid coil.

* * * * *